May 22, 1951     T. H. STANCLIFF     2,554,388

DRILL

Filed Jan. 29, 1946

Inventor
Thomas H. Stancliff

By E. V. Hardway
Attorney

Patented May 22, 1951

2,554,388

UNITED STATES PATENT OFFICE 2,554,388

DRILL

Thomas H. Stancliff, Houston, Tex.

Application January 29, 1946, Serial No. 644,028

1 Claim. (Cl. 255—71)

This invention relates to a drill and has particular relation to the bearing assembly of the rolling cutters of that type of drill generally used for drilling deep wells.

An object of the invention is to provide, in the rolling cutters of a drill, thrust bearings of such construction that the effectiveness and life of the thrust bearings will be greatly increased and said bearings, at the same time, may be cheaply produced.

The bearing assembly herein described has been particularly designed for mounting the side rolling cutters of the cross roller type of drill. These side rolling cutters are so mounted as to cut away the sides and bottom of the bore along an annular path and in deep well drilling they are subjected to great stresses in radial, as well as axial, directions.

In the conventional arrangement these rolling cutters are sometimes provided with roller bearings to take the radial load and ball bearings to take the axial load. In such arrangement where the ball bearings are subjected to the axial load, a very slight wear on the radial bearing or their races will cause a great radial load to be applied to the ball bearings along with their axial load thus overloading the ball bearings; and in this connection it may be stated that ball bearings are unsuitable for taking such overload particularly under the conditions to which they are subjected in well drilling, with the result that they will break down thus causing rapid deterioration of the bearing assembly.

If ball bearings are used in an assembly of this type, in order to provide space for said ball bearings when used as the axial thrust bearings of the rolling cutters the size and length of the radial roller bearings must be decreased. This results in a weaker bearing assembly which will not be of equal life to that of the rolling cutters mounted on said assembly so that the life of the drill will be exhausted before the rolling cutters have been worn out. An inefficient drill will thus be produced which will not keep the bore in proper gage.

In the present invention all available space for a maximum bearing assembly is employed.

Another, and more specific, object of the invention is to provide a bearing assembly wherein the total radial load upon the rolling cutters will be borne by radial bearings and whereby the thrust load will be carried by the thrust bearings.

A further object of the invention is to provide a bearing assembly of the character described for a rolling cutter wherein the bearings are so arranged that the radial bearings may have maximum longitudinal and transverse dimensions thus making it possible for the main load, or radial, bearing to sustain the entire radial load applied to the cutters.

A still further object of the invention is to provide, in a bearing assembly for a rolling cutter, a novel arrangement of thrust bearings having a maximum of load carrying capacity with a minimum requirement of space for said thrust bearing.

It is a still further object of the invention to provide a bearing assembly of the character described wherein roller bearings of maximum size are arranged substantially at the center of the radial load with thrust bearings so positioned as to sustain a maximum thrust load.

The invention also embodies a novel type of bearing assembly embodying a special type of retainer with the thrust bearings mounted therein, in a novel manner, whereby the thrust bearings will be properly spaced to receive uniform loads. The type of bearing assembly, herein disclosed may be cheaply and easily produced owing to the fact that only plane surfaces are required for the thrust bearing assemblies.

With the above and other objects in view the invention has particular relation to certain novel features of construction, arrangement of parts and use, an example of which is given in this specification and illustrated in the accompanying drawings, wherein.

Figure 1:
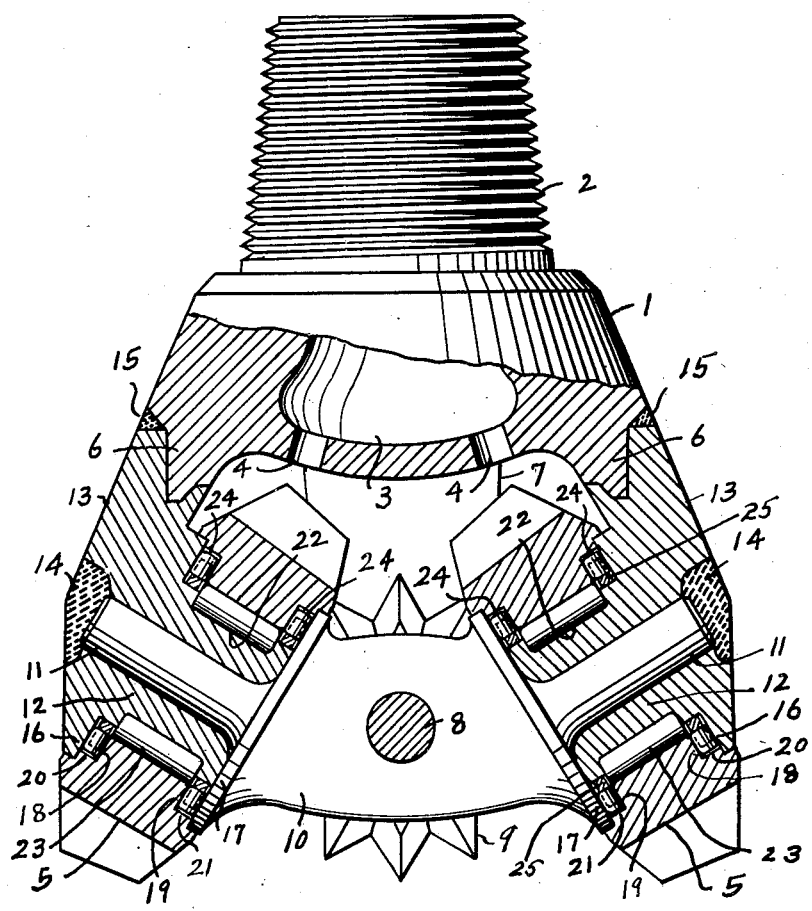
Figure 1 is a vertical cross sectional view of a cross roller type drill embodying the novel bearing assembly.
Figure 2:
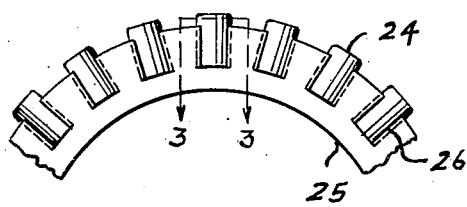
Figure 2 is a fragmentary side elevation of the thrust bearings.

Referring now more particularly to the drawings wherein like numerals of reference designate the same parts in each of the figures, the numeral 1 designates a drill head having the outwardly threaded shank 2 adapted to be connected to a drill stem.

As illustrated the head is cast hollow having the slush receiving chamber 3 to receive the drilling fluid from the drill stem and having the outlet ports 4, 4 leading from the chamber 3 and positioned so as to discharge the drilling fluid onto the rolling cutters 5, 5.

The body 1 is provided with the downwardly extended legs 6 and 7, the leg 7 being oppositely disposed and being provided to receive the ends of the cross pin 8 on which the cross rolling cutters 9 are mounted to rotate. There is a bridge 10 which supports the central portion of the pin 8 and the bridge is provided with the pins 11, 11 at its respective ends which diverge outwardly and upwardly.

The numerals 12, 12 designate spindles on which the rolling cutters 5 are mounted. The outer ends of these spindles are formed with anchors 13, 13 which are welded on each side to the legs 6, as hereinafter explained. The pins 11 extend axially through the spindles and are welded to the anchors 13 by the welds 14 and when the bridge, the spindles and the cutters are assembled this entire assembly is welded to the legs 6 by the welds 15, 15. The lower ends of the legs 6 are fitted into the adjacent portions of the anchors 13, as shown in Figure 1.

Each spindle has an abutment 16 at its outer end and at the inner end of each spindle the bridge 10 is formed with an abutment 17, said abutment 16 being countersunk into the corresponding outer ends of the rolling cutters 5 and the abutment 17 being countersunk into the inner ends of the rolling cutters 5.

Each rolling cutter is countersunk at its outer and inner ends thus forming the annular outwardly facing shoulders 18 and 19 as well as the annular shoulders 20 and 21, which face radially inwardly. The end faces of the grooves 22 as well as the faces of the shoulders 18, 19 are plane faces thus conducing to ease of manufacture. Between the shoulders 18 and 19 each rolling cutter has a bearing of cylindrical contour and opposite said bearing each spindle 12 has the annular countersunk groove 22, substantially equal in length to the length of said rolling cutter bearing and provided to receive the series of roller bearings 23 which take the radial thrust imparted to the rolling cutters 5 during the drilling operation.

From the foregoing description it is apparent that there will be an annular space left between the respective abutments 16, 17 and the opposing annular shoulders 18, 19 and within these spaces there are located the series of axial thrust roller bearings 24.

Figure 3:
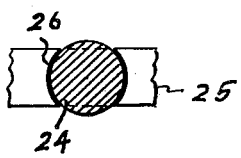
Figure 3 is a sectional view thereof taken on the line 3—3 of Figure 2.

The bearings 24 of each series of axial thrust roller bearings are mounted in the raceway rings 25. These raceway rings have the marginal notches 26 in their outer margins which extend out radially and in which the bearing rollers 24 are fitted. The facing sides of these notches are of the contour of cylindrical segments, as shown in Figure 3, and the roller bearings 24 are fitted rather snugly therein and are thereby maintained assembled with the raceway rings during installation.

In assembling the drill the outer axial thrust bearing assemblies are located against the corresponding abutments 16 and the radial thrust bearing rollers 23 are then assembled about the corresponding spindle and the corresponding rolling cutters then installed. The inner axial thrust bearing roller assemblies are then fitted into place and the corresponding pin 11 inserted through the spindle 12 and welded therein. When both rolling cutters are thus installed on their respective spindles and welded thereto the anchors 13 may then be fitted to the legs 6 of the drill head and welded thereto, as illustrated in Figure 1.

In the assembly above described substantial cylindrical roller bearings are provided to take the load of the radial thrusts to which the rolling cutters are subjected while drilling and substantial axial cylindrical thrust bearings are provided to sustain the end thrust to which such rolling cutters will be subjected during the operation of the drill.

The drawings and description are illustrative merely while the broad principle of the invention will be defined by the appended claim.

What I claim is:

In a drill having a head provided with a depending leg having a downwardly and inwardly directed bearing spindle, an annular rolling cutter on the spindle whose ends are countersunk to provide inside annular shoulders with outwardly directed faces and inside annular faces, an abutment on said leg opposing, and spaced from, one shoulder, a bridge pin extending axially through the spindle and having an abutment spaced from the other shoulder, roller bearings between said abutments and shoulders arranged to take the axial thrust of said rolling cutter, retainer rings in which the inner ends of said roller bearings are mounted, said spindle having spaced external shoulders in substantial alignment with the cutter shoulders and cylindrical roller bearings between the spindle shoulders on which the rolling cutter is mounted to rotate and which are provided to take the radial thrust of the rolling cutter.

THOMAS H. STANCLIFF.

REFERENCES CITED

The following references are of record in the file of this patent:

UNITED STATES PATENTS

| Number | Name | Date |
| --- | --- | --- |
| 1,422,585 | Lewellen | July 11, 1922 |
| 2,058,627 | Reed | Oct. 27, 1936 |
| 2,117,633 | Smith | May 17, 1938 |
| 2,132,498 | Smith et al. | Oct. 11, 1938 |
| 2,184,129 | Stancliff | Dec. 19, 1939 |
| 2,203,846 | Stancliff | June 11, 1940 |
| 2,325,745 | Crum | Aug. 3, 1943 |
| 2,327,880 | Fernstrom | Aug. 24, 1943 |

FOREIGN PATENTS

| Number | Country | Date |
| --- | --- | --- |
| 499,180 | Great Britain | Jan. 19, 1939 |